Nov. 3, 1970     J. R. FAVEREAU     3,538,364
ROTARY ELECTRICAL MACHINE OF DIRECT
OR ALTERNATING CURRENT TYPE
Filed Jan. 13, 1969
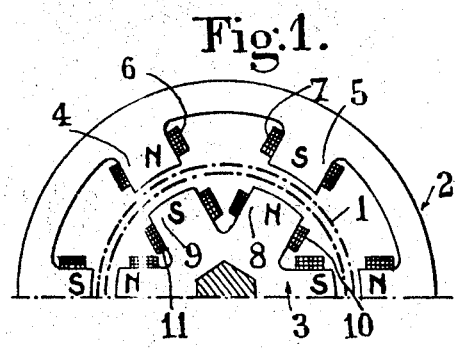
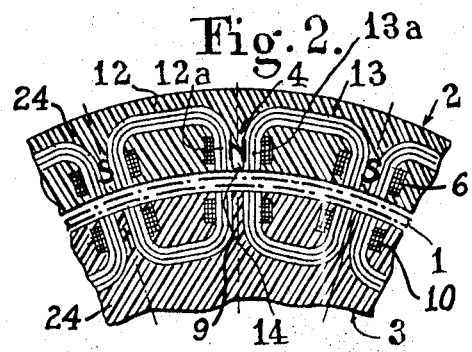
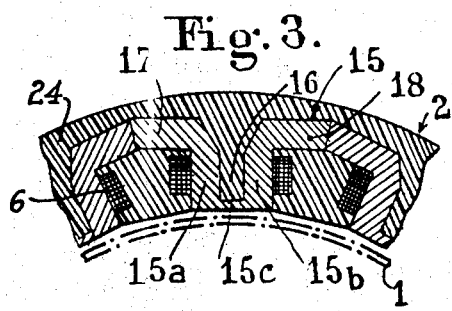
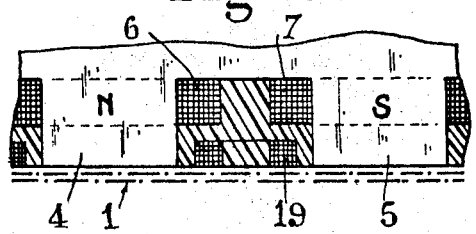
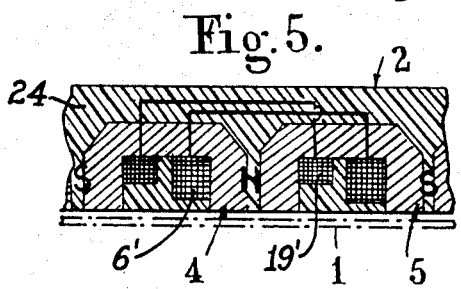
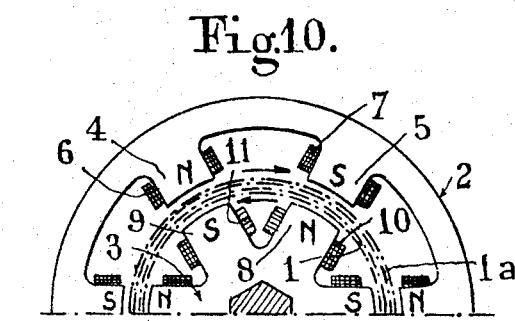
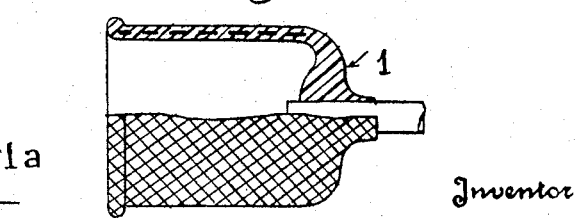
Inventor
Jacques René Favereau
By Pierre, Scheffler & Parker
                                         Attorneys

United States Patent Office 3,538,364
Patented Nov. 3, 1970

3,538,364
ROTARY ELECTRICAL MACHINE OF DIRECT
OR ALTERNATING CURRENT TYPE
Jacques René Favereau, Montmorency, France, assignor to Compagnie Electro-Mecanique, Paris, France, a body corporate of France
Filed Jan. 13, 1969, Ser. No. 790,782
Claims priority, application France, Jan. 30, 1968, 137,938
Int. Cl. H02k 23/64
U.S. Cl. 310—158                 11 Claims

ABSTRACT OF THE DISCLOSURE

A rotary electric machine of the direct or alternating current type comprises a fixed primary in the form of a pair of concentrically arranged inner and outer stator elements and between which the secondary in the form of a cylindrical rotor having a winding thereon is mounted for rotation. Each of the stator elements is provided with a series of the same number of salient poles alternating in polarity and the poles of the two stator elements are in axial and radial alignment and are of opposite polarity so that a north pole of the outer stator element faces a south pole of the inner stator element, and vice versa around the pole series.

---

The present invention relates to the structure of a direct or alternating current rotary electric machine with cylindrical secondary rotor, and is characterized in that the fixed primary comprises two concentric stators of revolution around the axis of the machine, between which the secondary rotor turns.

This arrangement offers the advantage of permitting a very substantial reduction in the size of the leakage fluxes. Moreover, thanks to a reduction in the volume of the coils situated around the poles, it permits increasing the working induction in the cylindrical airgap.

According to another characteristic of the present invention, each of the primary poles is formed of two semi-poles separated by a non-magnetic (air or insulation filled) gap.

This characteristic has the advantage of offering maximum reluctance to the transverse flux of secondary reaction, without affecting the reluctance of the primary flux.

Below will be described, by way of non-limiting examples, various forms of execution of the present invention, with reference to the attached drawing in which:

FIG. 1 is a half-view in cross section of a rotary electric machine according to the invention;

FIG. 2 is a view in partial cross section of the internal and external stators of the fixed primary;

FIG. 3 is a view in partial cross section of a variation of execution of the external stator;

FIG. 4 is a partial schematic view in development of a variation of execution of a stator of the primary;

FIG. 5 is a partial, schematic view in development of another variation of execution of a stator of the primary;

FIGS. 6, 7 and 8 are views in partial cross section of various forms of execution of the secondary rotor;

FIG. 9 is a view, half in elevation, half in axial section, of a bell-shaped rotor; and FIG. 10 is a half-view in cross section of a rotary electric machine with two rotors.

The rotary electric machine represented in FIG. 1 comprises a cylindrical rotor 1, indicated in dotted lines, various forms of execution of which will be described below. This rotor 1 rotates between external stator 2 and internal stator 3 constituting the fixed primary. The external stator 2 has, on its inner perimeter, a ring of alternating north poles 4 and south poles 5 of the salient type on which are wound, respectively, windings 6 and 7.

Likewise, the inner stator 3 is constituted by a star-wound core having, on its perimeter, an alternation of north poles 8 and south ploes 9 of the salient type bearing windings 10 and 11 respectively. Distribution of the primary poles 4 and 5 on the outside of rotor 1 and of primary poles 8 and 9 on the inside of this rotor, insures a very substantial reduction in the size of the leakage fluxes. Moreover, since it reduces the volume of coils 6, 7, 10, 11 situated around the poles, it permits increasing the effective induction in the airgap.

According to another characteristic of the invention, the primary poles are made in such a way as to offer the maximum reluctance to the transverse flux of the secondary reaction, without affecting the reluctance of the primary flux.

With this in mind, the various primary poles can be formed from elementary magnetic circuits constituted by packets of metal sheet wound substantially in a U-shape and glued together, as illustrated in FIG. 2. One can see in this figure that any pole, for example, a north pole 4, is formed by the combination of two adjacent packets of metal sheets 12 and 13. The sheets in these packets are bent in substantially a U shape and the lateral arms 12a and 13a of these packets are disposed close to one another but not touching. A space 14 is thus delimited between the lateral arms 12a and 13a, this space 14 constituting a nonmagnetic gap which can be filled with insulating material. All the primary poles of the outer stator 2 and inner stator 3 are made in this way.

It can be seen that the various spaces 14 constituting the non-magnetic gaps, and formed along the axes of the primary poles, oppose the passage of the secondary reaction flux, by imposing a substantially equal division of the total primary flux into two parts circulating in each of the half-poles constituted by lateral arms 12a and 13a.

According to a variation of execution, which is illustrated in FIG. 3, each of the elementary magnetic circuits of a stator is constituted by a magnetic part 15 of solid or laminated material which includes two radially extending portions 15a, 15b constituting the pole proper and around which the winding 6 is placed and two circumferentially extending parts 17, 18 which adjoin similarly circumferentially extending parts of adjacent elementary magnetic circuits. An isthmus 15c connects the radially extending portions 15a, 15b at the end of the pole but the remainder of these portions 15a, 15b are separated by a non-magnetic gap 16 which also separates the circumferentially extending parts 17, 18.

In the rotary electric machine just described, the excitation can be independent or in series. To improve commutation one can provide an auxiliary winding 19 without core lodged between two adjoining poles 4 and 5 of the primary, as illustrated in FIG. 4.

In a particular case of series excitation, this commutation winding, combined with the excitation, leads to a particular arrangement of the primary, as illustrated in FIG. 5. In this case, the pole excitation and commutation windings 6' and 19' are combined on the inner stator and/or outer stator and placed dissymmetrically in the opening between adjourning poles. In this way there is created at the level of the commutation zone, a flux of suitable direction with practically the same weight of copper as the series primary alone. This mounting has the same effect as an offsetting of the brushes. It is only valid for a single direction of rotation.

In the embodiments illustrated in FIGS. 2, 3 and 5, in which the stator element is constituted by a circumferential array of adjacent elementary magnetic circuits defining the poles proper and the circumferential magnetic paths between adjacent poles, the whole can be held together by embedding the elementary magnetic circuits in a solid insulating material 24.

With reference now to FIGS. 6 to 9, various forms of the secondary rotor will now be described. The rotor is a hollow cylinder turning between the outer stator 2 and the inner stator 3 of the primary, and whose thickness is formed essentially by the winding layer. To reduce the airgap reluctance, between the conductors, a magnetic material is inserted. This can be achieved in different ways, as illustrated in FIGS. 6, 7, and 8.

In the form of execution illustrated in FIG. 6, the rotor 1 is constituted by rings of notched metal sheets, of magnetic material. In the notches 20 of these rings are lodged the conductors 21. The teeth 22 thus delimited by the notches are connected together by isthmuses 23 which are placed at the bottom of the notch on the inner diameter (FIG. 6) or on the outer diameter (FIG. 7). The notches 20 can be open, as represented in FIGS. 6 and 7, or half-closed. The isthmuses 23 are saturated by the notch leakage flux.

In the case of FIG. 7, the magnetic ring plays, at least partly, the role of a fret for conductors 21, against the centrifugal force.

In the form of execution represented in FIG. 8, longitudinal magnetic bands 24 are disposed between conductors 21, the whole being embedded in resin and fretted on the outside.

Whatever the disposition adopted, the assembly of the bell-shaped rotor (FIG. 9) can be fretted according to the filamentary technique, with the use of interlaced glass threads impregnated with resin.

The transmission of the couple is accomplished by an insulating or a magnetic piece of a shape constituting the bottom of the bell, a piece keyed on the shaft. The secondary is connected, according to the particular case, to a collector or to rings.

The characteristics of the secondary rotor, which have just been described with reference to FIGS. 6 to 9, can also apply to a rotor as illustrated in FIG. 10. The latter comprises a primary similar to that of the machine in FIG. 1, but two concentric hollow, cylindrical rotors 1 and 1a, are provided to constitute a double motor.

If the rotors turn in opposite directions, and if the electromotive forces (E.M.F.) of the two rotors are equal, (rotors identical, currents equal by grouping in series), the resultant of the rotor currents is zero, which gives the equivalent of a compensated motor. This effect of compensation is independent of the speed of each rotor, which also allows one to envisage operation with one fixed rotor, the other being mobile or, also, with two rotors mobile in opposite directions, at the same speed or at different speeds.

The two rotors 1 and 1a can be coupled mechanically to a single load with a suitable reducer, the whole constituting a differential.

It is, moreover, understood that the various methods of embodiment of the invention which have been described above, in reference to the attached drawing, have been given purely by way of indication and are in no way limiting, and that many modifications can be imparted without thereby departing from the scope of the present invention.

I claim:

1. A rotary electrical machine of the direct or alternating current type comprising a fixed primary constituted by a pair of concentrically arranged outer and inner radially spaced stator elements and a secondary constituted by a cylindrical rotor coaxial with said stator elements, said rotor having a winding thereon and being mounted for rotation in the space between said stator elements, each of said stator elements being provided with a series of the same number of salient poles having a winding thereon and alternating in polarity, said poles of the two stator elements being arranged such as to locate a north pole of said outer stator element in axial and radial alignment with a south pole of said inner stator element and vice versa, around the pole series.

2. A rotary electric machine as defined in claim 1 wherein each of said salient poles is constituted by two half-poles separated by a non-magnetic gap.

3. A rotary electric machine as defined in claim 2 wherein said non-magnetic gap is filled with insulating material.

4. A rotary electric machine as defined in claim 1 wherein each of said salient poles of at least one of said stator elements is constituted by two spaced lateral arms of two adjacent elementary magnetic circuits each having a U-shaped configuration.

5. A rotary electric machine as defined in claim 4 wherein each said U-shaped elementary magnetic circuit is constituted by a packet of metallic sheets adhered together.

6. A rotary electric machine as defined in claim 1 wherein at least one of said stator elements is constituted by adjacent elementary magnetic circuits each including one radially extending part constituting the salient pole to which the pole winding is applied and two circumferentially extending parts which adjoin the circumferentially extending parts of adjacent elementary magnetic circuits, said radially and circumferentially extending parts of each said elementary magnetic circuit being separated by a non-magnetic gap.

7. A rotary electric machine as defined in claim 1 wherein at least one of said stator elements is constituted by a circumferential array of adjacent elementary magnetic circuits defining said poles proper and the circumferentially extending magnetic paths between adjacent poles, said elementary magnetic circuits being at least partially embedded in a solid insulating material.

8. A rotary electric machine as defined in claim 1 wherein the winding on the stator element is located symmetrically in the opening between the poles.

9. A rotary electric machine as defined in claim 1 wherein said cylindrical rotor comprises rings of notched metal sheets made of magnetic material to establish circumferentially spaced teeth, and windings located in the spaces between the teeth.

10. A rotary electric machine as defined in claim 1 wherein said cylindrical rotor comprises longitudinally extending circumferentially spaced bands of magnetic material separated by windings, said bands of magnetic material and said windings being embedded in a casting resin.

11. A rotary electric machine as defined in claim 1 wherein two cylindrical co-axially mounted rotors are provided in the space between said stator elements.

References Cited

UNITED STATES PATENTS

| 1,977,950 | 10/1934 | Morhard | 310—166 |
| 2,411,122 | 11/1946 | Winther | 310—266 |
| 2,759,116 | 8/1956 | Glass | 310—266 |
| 2,849,630 | 8/1958 | Waloff | 310—266 |
| 2,864,017 | 12/1958 | Waltscheff | 310—166 |
| 3,117,244 | 1/1964 | Rosain | 310—67 |
| 3,248,584 | 4/1966 | Knauer | 310—266 |

FOREIGN PATENTS

| 872,309 | 7/1961 | Great Britain. |
| 1,090,937 | 11/1967 | Great Britain. |
| 468,415 | 1/1952 | Italy. |

MILTON O. HIRSHFIELD, Primary Examiner

R. SKUDY, Assistant Examiner

U.S. Cl. X.R.

310—43, 68, 180, 266, 269

PO-1050
(5/69)

UNITED STATES PATENT OFFICE
CERTIFICATE OF CORRECTION

Patent No. 3,538,364　　　　　　　Dated　November 3, 1970

Inventor(s)　JACQUES RENE FAVEREAU

It is certified that error appears in the above-identified patent and that said Letters Patent are hereby corrected as shown below:

In claim 8 - last line - "dis- has been omitted before the word "symmetrically". The line should read: -- dis-symmetrically in the opening between the poles. --

SIGNED AND
SEALED
MAR 9 1971

(SEAL)
Attest:

Edward M. Fletcher, Jr.
Attesting Officer

WILLIAM E. SCHUYLER, JR.
Commissioner of Patents